US 8,060,871 B2

(12) United States Patent
Bernabeu-Auban et al.

(10) Patent No.: US 8,060,871 B2
(45) Date of Patent: Nov. 15, 2011

(54) SERVICING SOFTWARE THROUGH VERSIONING

(75) Inventors: Jose M. Bernabeu-Auban, Sammamish, WA (US); Luis Irun-Briz, Picanya (ES); Stephen E. Dossick, Redmond, WA (US); Frank V. Peschel-Gallee, Redmond, WA (US); Stephan J. Zachweija, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1532 days.

(21) Appl. No.: 11/393,347

(22) Filed: Mar. 30, 2006

(65) Prior Publication Data

US 2007/0240147 A1    Oct. 11, 2007

(51) Int. Cl.
*G06F 9/44* (2006.01)
*G06F 9/45* (2006.01)
*G06F 9/445* (2006.01)

(52) U.S. Cl. ........ 717/174; 717/120; 717/121; 717/122; 717/123; 717/124; 717/168; 717/169; 717/170; 717/171; 717/172; 717/173; 717/177; 717/178

(58) Field of Classification Search .......... None
See application file for complete search history.

(56) References Cited

U.S. PATENT DOCUMENTS

| | | | | |
|---|---|---|---|---|
| 6,389,589 B1* | 5/2002 | Mishra et al. | ............... | 717/170 |
| 6,418,554 B1* | 7/2002 | Delo et al. | ............... | 717/174 |
| 6,477,703 B1* | 11/2002 | Smith et al. | ............... | 717/168 |
| 6,671,818 B1* | 12/2003 | Mikurak | ............... | 714/4 |
| 7,676,788 B1* | 3/2010 | Ousterhout et al. | ............... | 717/106 |
| 2002/0059425 A1* | 5/2002 | Belfiore et al. | ............... | 709/226 |
| 2002/0129356 A1* | 9/2002 | Hellerstein et al. | ............... | 717/177 |
| 2004/0210653 A1* | 10/2004 | Kanoor et al. | ............... | 709/223 |
| 2005/0091635 A1* | 4/2005 | McCollum et al. | ............... | 717/101 |
| 2005/0132354 A1* | 6/2005 | Edwards et al. | ............... | 717/174 |
| 2005/0262494 A1* | 11/2005 | Fung et al. | ............... | 717/170 |
| 2006/0184926 A1* | 8/2006 | Or et al. | ............... | 717/168 |
| 2006/0271924 A1* | 11/2006 | Calcaterra et al. | ............... | 717/168 |

OTHER PUBLICATIONS

FitzSimons, R. et al., "How to Build and Service Isolated Applications and Side-by-Side Assemblies for Windows XP", Aug. 24, 2001 (Updated—Oct. 2004), http://msdn.microsoft.com/library/en-us/dnwxp/html/sidexsidewinxp.asp?frame=true, 22 pages.

* cited by examiner

*Primary Examiner* — Emerson Puente
*Assistant Examiner* — Jonathan R Labud
(74) *Attorney, Agent, or Firm* — Woodcock Washburn LLP

(57) ABSTRACT

Software typically changes over its useful lifetime. New versions of software are created to change or improve functionality, to add functionality, to correct coding errors, improve performance, to adapt to new hardware and for many other well-known reasons. The process of delivering new versions of software to users is called servicing the software. The operating system decides which version(s) of a piece of software satisfy dependencies of other software by creation of a context. The context may be used to organize and manage versions of software, to declare activation policies concerning the use of different versions of software and to service the versioned software. The context may include an activation service that maintains and manages resolution polices, resolves dependencies, constructs the environment in which an application runs and initiates the running of the software.

19 Claims, 3 Drawing Sheets

SERVICING SOFTWARE THROUGH VERSIONING

BACKGROUND

Software typically changes over its useful lifetime. New versions of software are created to change or improve functionality, to add functionality, to correct coding errors, improve performance, to adapt to new hardware and for many other well-known reasons. The process of delivering new versions of software to users is called servicing the software.

A typical operating system does not know what executable software resides on the machine nor does it know what system or software resources are needed by the software to execute. It follows, therefore, that the operating system can have no knowledge of how or if one piece of software depends on another and will be unable to determine if a particular piece of software will run. This state of affairs makes it difficult to properly service software. For example, in the course of installing new software, one version of a program relied on by an existing piece of software may be overwritten with a new version, rendering the existing piece of software inoperable. The operating system is unable to prevent this from happening because it does not know that the existing piece of software needs a different version of the program.

SUMMARY

The operating system manages a set of software entities by creating a construct called a context that organizes and manages software-related state and enables software to be serviced through versioning. Software-related state includes the condition of the software entities themselves, their property settings, versioning information and the setting of activation policies. The context may include an installation service and an activation service. The installation service is responsible for installing, uninstalling and servicing software entities within its context. The installation service keeps track of what software is installed and available within the context, the version of the installed software, what resources are needed by the software to run and makes installed software entities available to the activation service. The activation service maintains and manages resolution polices, resolves dependencies, constructs the environment in which an application runs and initiates the running of the software.

One type of software entity managed by the context is a software item. A software item is a uniquely-identified unit comprising a piece of program code (source and/or executable) accompanied by metadata. The metadata may be provided in the form of a manifest. Metadata may include versioning information, dependencies, and other information. A dependency refers to the requirement of one software entity for a second software entity. A software item may have a dependency on one or more other software items. One or more ranges of versions of software items which can be used to satisfy a dependency may be expressed as part of a dependency declaration. When multiple ranges of versions satisfy a dependency, an order of preference may be provided for the ranges. Also, ranges of versions of software items which are inadequate to solve the dependency may be declared.

A software item comprising code and metadata is received by an installation service. A global policy table provides a mechanism for system administrators to set policy. A calculated local dependency table is created for each software item by filtering software dependencies reflected in the local dependency table through entries in the global policy table. An activation service includes a dependency resolution mechanism that resolves conflicts between dependencies and returns a solution set. Each solution of the solution set includes a set of software items with all their dependencies satisfied under the restrictions described in the policy as well as in the dependency requirements of the included software. A single solution is selected from the set of possible solutions. An activation schema is generated using the selected solution

DETAILED DESCRIPTION

Overview

An operating system according to some embodiments of the present invention is aware of what executable software resides on the machine and what resources, including other software entities, are needed by the software to execute. The operating system is aware of how or if one piece of software depends on another and is able to determine if a particular piece of software will run. The operating system is aware of what other software is needed for the software to run.

Servicing software entities makes a different (usually newer) version of the software available to the system, and may include the installation of the newer version of the software. New versions of software may be made available to reduce defects, improve function, provide new functions, modify previously provided functions, accommodate new hardware or for other well-known reasons.

When software A expects to use the functionality of software B to perform its function, it is said that software A has a dependency on software B. Servicing a piece of software introduces the problem of determining if and how changing the software will affect other software that depends on it. In accordance with embodiments of the invention, the operating system manages and controls installing and servicing software. A software item comprising code and metadata is received by an installation service. A global policy table provides a mechanism for system administrators to set policy. A calculated local dependency table is created for each software item by filtering software dependencies reflected in the local dependency table through entries in the global policy table. An activation service includes a dependency resolution mechanism that resolves conflicts between dependencies and returns a solution set. Each solution in the solution set includes a set of software items with all their dependencies satisfied under the restrictions described in the global policy as well as in the dependency requirements of the included software. In some embodiments the set of software items returned as the solution does not include software items which are not required or are duplicative. A single solution is selected from the set of possible solutions. In some embodiments of the invention, the single solution is selected based on policy set in the computing environment. An activation schema is generated using the selected solution.

Exemplary Computing Environment

Figure 1:
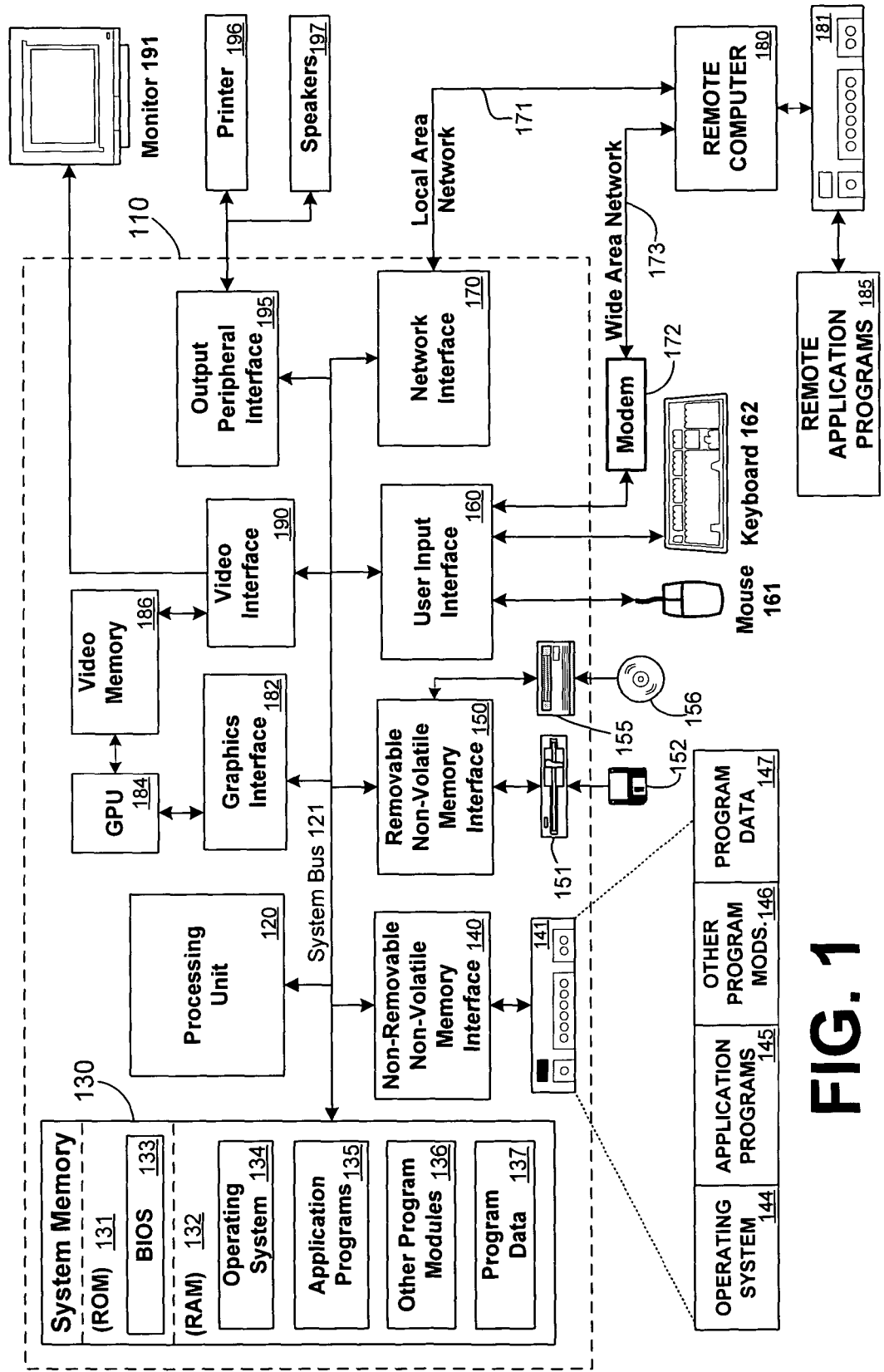
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that any environment making use of software components whose versions may change over time due to servicing are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN, networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Servicing Software Through Versioning

The operating system manages a set of software entities by creating a construct called a context. A context is used to organize software-related state and to declare policies in a system. The context enables the operating system to decide which versions of a software entity satisfy the dependencies of other software entities and to install the appropriate software entities. A context may represent a system context, developer context, manager context, user context or other type of context.

Figure 2:
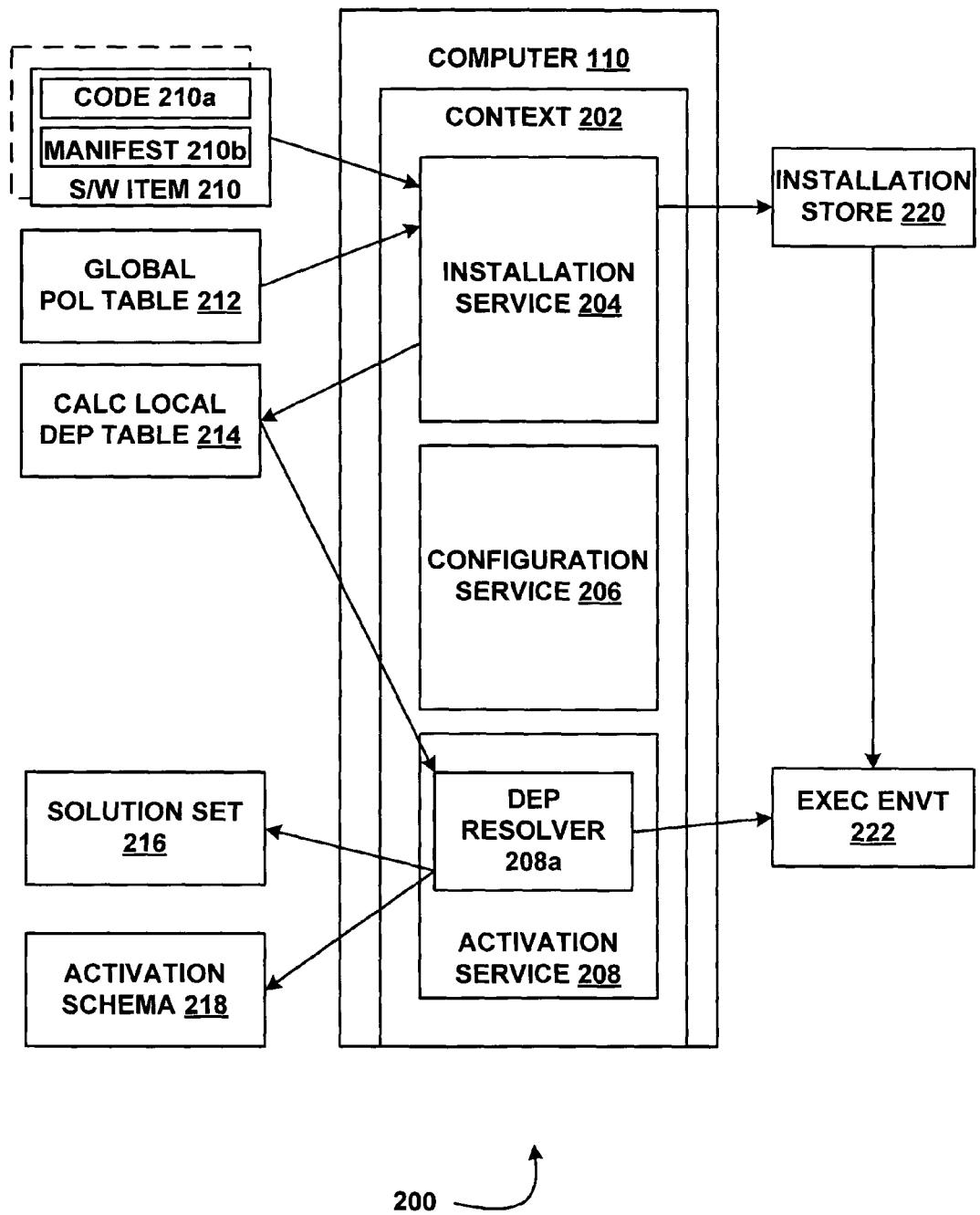
FIG. 2 is a block diagram of a system for servicing software through versioning in accordance with some embodiments of the invention.

A context may include an installation service and an activation service. FIG. 2 illustrates one embodiment of a system 200 for servicing software through versioning. System 200 may reside on a computer such as computer 110 described above with respect to FIG. 1. In FIG. 2, a context 202 includes an installation service 204, and an activation service 208.

One type of software entity that can be managed by a context such as context 202 is a software item 210. A software item is a resource known to the operating system by a unique name or identifier. In some embodiments of the invention, it includes program code and associated data, including version information (typically presented as a number that is incremented as changes are made to the software over its lifetime), packaged into a unit. The software item may include source and/or executable code 210a and metadata. Software items that provide code to be executed within a defined environment are called executable software items (e.g., a file that ends in .EXE is one type of file that represents the code portion of an executable software item). Collections of shareable code and data are called framework software items (e.g., a file that ends in .DLL is one type of file that represents the code portion of a framework software item). An executable or framework software item may depend on or require one or more additional executable or framework software items for execution. In some embodiments of the invention, each executable software item and each framework software item is expected to declare the set of other executable software items and framework software items that it depends on. The set of software items on which the software item depends is referred to as its dependencies.

As stated above, the software item may also include metadata. In some embodiments of the invention, the metadata accompanying the code is provided in a manifest 210b. The metadata may include versioning information of the software item 210 and dependency information. The metadata may also include the dependency list for the software item. For example, a software entity such as a software item, (e.g., Software Item D), may require the presence of another software item, (e.g., Software Item C), in order to run. It will be appreciated that Software Item C is likely to have its own dependencies. For example, software item C may itself have two dependencies, dependency 1, satisfied by software item A and dependency 2 satisfied by software item B. Thus, assuming that A and B have no new dependencies of their own, to run software item D, software items A, B, C and D must be available. The dependency may be required or optional. For example, instead of being required, Software Item C may add functionality but not be necessary for Software Item D to run. (For example, a word processing program may have an optional thesaurus installed but the word processing program may not require the thesaurus to run.) Dependencies may have version requirements, (e.g., Software Item C, version 2 must be present for Software Item D, version 4 to run). In some embodiments of the invention, the version requirement may contain a number of ranges of versions preferred to satisfy a certain dependency. Also, in some embodiments of the invention, ranges of versions inadequate to solve the dependency may be included. The list of software items that are used to satisfy each dependency may be calculated when the software item is installed. Each time a software item is installed, the way dependencies are satisfied may be altered, requiring the re-computation of at least some of the dependencies.

Metadata may also include a property set, a list of property name/value type pairs. In some embodiments the code of the software item can access only the declared properties, via the established property names. The values assigned to the properties for a particular context may be referred to as configuration data. Metadata may also include resources the code may need to run, and other information.

An installation service (e.g., installation service 204) keeps track of what software is installed and available within the context, the version of the installed software, what resources are needed by the software to run and what configuration properties or settings have been defined for the software entity. The installation service also installs, removes, and services software entities and makes the installed software items available to the activation service. When a software item such as software item 210 is received by the installation service for installation, the code 210a may be stored in the installation store 220. Once a software item is installed, it may be immutable. That is, once a software item is stored in the installation store no system event will alter the existing software item. Installation of a new or different version of the software item will not affect the existing software item. In some embodiments, software not installed by the installation service cannot be executed on the computer.

When a software item is received by the installation service, the metadata of the software item (e.g., perhaps provided in the form of a manifest 210b) maybe entered into a local dependency table (not shown). The local dependency table may be filtered by a global policy table 212 to create a calculated local dependency table 214. For example, a manifest 210b may be received by the installation service 204. The manifest 210b may include information about dependencies of the software item. For example, the manifest may indicate that software item A 1 has dependencies 1, 2 and 5. The manifest may represent the experience of the publisher of the software item: for example, the publisher of the software may have determined that the software item A 1 works with versions 1 and 3 of dependency 2 but not with version 2. This information may be included in the manifest. Similarly, the information may be presented in ranges, (e.g., software item A 1 works with versions 3-5 of dependency 2). From the manifest, a local dependency table may be generated. The local dependency table is filtered by global policies represented in a global policy table 212 to created a calculated local dependency table (e.g., local dependency table 214)

The global policy table 212 enables policy to be set across the entire system or across one or more contexts. That is, global policy can dictate which software items the system allows for activation and which software items can substitute for other software items. When multiple options exist, the global policy table 212 can establish a preference of which option to select. The global policy table 212 may provide a mapping function whereby use of one or more versioned software item is re-mapped to sets of preferred software items. For example, a global policy table 212 may specify that whenever any version of software item A is encountered, version 1 of software item A should be used instead. Similarly, the global policy table may specify that whenever software item B version 2 is encountered, software item B version 4 should be substituted for software item B 2.

In some embodiments of the invention, the substitution takes place in a calculated local dependency table 214. That is, for each dependency of a software item installed into the context, the installation service determines a set of software items represented in the local dependency table. The local dependency table is filtered by the global policy table, creating a calculated local dependency table 214. In some embodiments of the invention, the rows of the calculated local dependency table represent software items and the columns represent the dependencies of the software items. For example, a local dependency table may include the following information:

|     | dependency 1 | dependency 2 | dependency 3 |
| --- | --- | --- | --- |
| E 2 | A4, A5 | B1 | |
| B1 | A4 | | C4 |

Row 1, column 1, indicates that dependency 1 for Software Item E, version 2 can be satisfied by either software item A, version 4 or A version 5. Suppose the global policy table indicates that A4 is not to be used. The calculated local dependency table for a particular context may then appear as follows:

|     | dependency 1 | dependency 2 | dependency 3 |
| --- | --- | --- | --- |
| E 2 | A5 | B1 | |
| B1 | A4 | | C4 |

(A4 has been removed as an alternative for satisfying dependency 1 of software item E, version 2. Positive and negative ranges may be specified, both in the metadata (e.g., in the manifest) and in the tables. For example, dependency 1 for software item A may be satisfied by a number of versions. This may be represented as a positive range (e.g., B, range 2-3, B range [3-6]). Similarly, it may be known that dependency 1 for software item A cannot be satisfied by a number of versions. This may be represented as a negative range (e.g., B exclude range [3-4]). Ranges may be open, closed, or semi-closed (i.e., open at one end and closed at the other end.)

The activation service 208 constructs the environment in which an application will run (e.g., execution environment 222) and initiates the software. Before a software item can be activated, a set of acceptable values for the dependencies of the software items and the dependencies of their dependencies, and so forth, must be determined. In some embodiments, the dependency resolver 208a of the activation service 208 resolves dependencies, determines if all dependencies are satisfied and loads the software items satisfying the dependencies (received from the installation service) into the execution environment 222. A software item may not be activated unless all of the required dependencies are satisfied. Software item resolution may occur, at least in part, when the software item is installed. The resolution may be saved or persisted and reused whenever the item is activated. Alternatively, software item resolution may occur at activation time. Activation of an executable includes creating an isolated process by providing the execution environment 222 with the code 210*a* the executable software item carries with it. Activation of a framework software item includes loading one or more of the framework codes within a particular process memory space so that it can be executed. Dependencies between software items mean that activation of a software item may require that other framework software items are loaded along with the software item.

The inputs to a resolution mechanism 208*a* that performs the above functions include the calculated local dependency table 214 which provides a table including a set of alternatives for satisfying dependencies. The resolution mechanism 208*a* returns a set of possible solutions 216. In some embodiments of the invention, a single solution is selected. Considerations for selection of the single solution from the set of solutions may include the following:

the latest (most current) compatible version of the software item may be preferred
   tested versions may be preferred
   publisher recommendations may be followed
   maximum functionality may be preferred
   fewest number of software pieces may be preferred
   lowest integration risk may be preferred
   reduction of code size may be preferred
   maximum isolation of executable may be preferred.

Appropriate policy settings in the computing environment may be used to select the particular consideration, or set of considerations to take into account. An activation schema (e.g. activation schema 218) may be generated from the selected single solution.

In some embodiments of the invention, in addition to the above listed components of a context, another component called a configuration service 206 is included. The configuration service 206 maintains, manages and mediates configuration settings associated with the software. Before a software entity is activated, its properties must be initialized to proper values. The process of setting these values is called configuration. In some embodiments of the invention, property values for a software entity such as a software item are stored in a configuration store (not shown). The set of property values for an application in a context contributes to application state. Configuration settings are provided to the activation service for a software item and its dependencies when a software item is to be executed.

Figure 3:
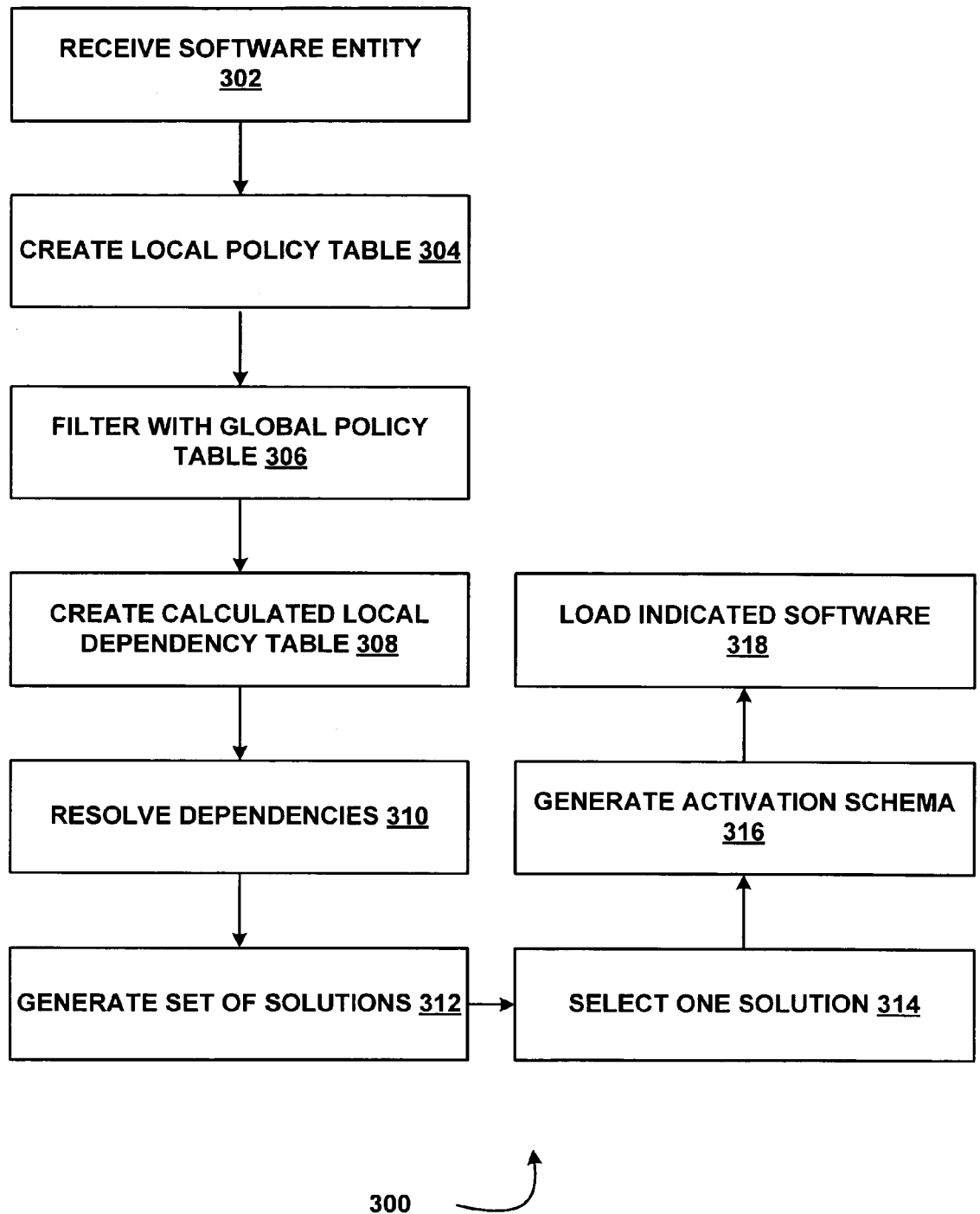
FIG. 3 is a flow diagram of a method for servicing software through versioning in accordance with some embodiments of the invention.

FIG. 3 illustrates a method 300 for servicing software through versioning in accordance with some embodiments of the invention. At 302 a software entity is received. In some embodiments of the invention, the software entity is a software item, as described above and is accompanied by metadata. One way to provide this metadata is by a manifest. Metadata associated with the software item may include any one or more of the following:

versioning information, a description of the configuration data the code uses, resources the code may need to run, dependencies, and other information. At 304 a local dependency table is created. The local dependency table may include information received from the manifest concerning dependencies of the software item. At 306 the local dependency table may be filtered by information presented in the global policy table. The global policy table enables policy to be set across the entire system or across one or more contexts. That is, global policy can dictate which software items the system allows for activation and which software items can substitute for other software items. When multiple options exist, the global policy table can establish a preference of which option to select. The global policy table may provide a mapping function whereby use of one or more versioned software item is re-mapped to sets of preferred software items. Filtering the local dependency table with the global policy table may result in changes to the local dependency table and creation of a calculated local dependency table (308). At 310, the calculated local dependency table is provided as input to a dependency resolver. The dependency resolver generates a set of potential solutions to the dependency requirements of the software item and its dependencies at 312 as described above with respect to FIG. 2. At 314 one of the solutions is selected and an activation schema is generated therefrom (316). At 318, the software items described in the activation schema are loaded into an execution environment from the installation store.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for servicing software, comprising:
  an installation service for servicing a first software item, wherein the first software item comprises program code and metadata packaged into a unit, the metadata comprising a list of software requirements for execution of the program code, the installation service configured to generate from the list of software requirements, a local dependency table, and filter the local dependency table with a global policy for generating a calculated local dependency table that is used to resolve one or more version-related dependencies between the first software item and at least one another software item.

2. The system of claim 1, further comprising an activation service, the activation service configured to use the calculated local dependency table to generate a set of potential solutions from which a single solution is selected and an activation schema created.

3. The system of claim 1, the first software item comprising metadata that includes versioning information for the first software item and for the software required by the first software item to execute.

4. The system of claim 3, wherein the versioning information for the first software item represents knowledge of a publisher of versions of software required by the first software item which work with the software item.

5. The system of claim 3, wherein the versioning information for the first software represents knowledge of a publisher of versions of software required by the first software item which do not work with the first software item.

6. The system of claim 1, further comprising an activation service, the activation service configured to use the calculated local dependency table to generate a set of potential solutions from which a single solution is selected and an activation schema created, the selection of the single solution based on a policy decision comprising at least one of:
  selecting the single solution based on a most current compatible version of the software item;
  selecting the single solution based on testing;
  selecting the single solution based on a publisher recommendation;
  selecting the single solution based on maximum functionality;
  selecting the single solution based on a solution including a fewest number of software pieces;
  selecting the single solution based on a lowest integration risk;
  selecting the single solution based on a size of code; or
  selecting the single solution based on maximum isolation of an executable.

7. The system of claim 1, wherein the first software item requires its own execution environment.

8. The system of claim 1, wherein the first software item is loaded into an execution environment of a second software item.

9. A method for servicing software through versioning comprising:
  receiving a first software item for installation on at least one computing device, the first software item comprising a piece of program code and metadata associated with the program code packaged into a single unit, the metadata comprising dependencies of the first software item, dependencies comprising a list of software items that the first software item being installed requires in order to execute, a version number being associated with each dependency;
  creating from the metadata, a local dependency table that indicates dependency requirements between a version of the first software item being installed and a plurality of versions of a second software item;
  filtering the local dependency table of alternative dependencies with global policy considerations to generate a calculated local dependency table by omitting at least one version amongst the plurality of versions of the second software item contained in the local dependency table.

10. The method of claim 9, further comprising:
  using the calculated local dependency table to generate a set of potential solutions for the dependency requirements.

11. The method of claim 10, further comprising:
  selecting from the set of potential solutions a single solution for execution based on policy set on the at least one computing device.

12. The method of claim 11, further comprising:
  generating an activation schema from the single solution.

13. The method of claim 12, further comprising:
  creating an execution environment for the first software item; and
  loading the software items specified in the activation schema into the execution environment.

14. A computer-readable storage medium having program code stored thereon that, when executed by a computing environment, causes the computing environment to:
  create a context comprising an installation service that manages installation of software, and an activation service that creates an execution environment;
  wherein the installation service determines a set of dependencies comprising a list of software items required by a first software item for execution and wherein the installation service determines a set of alternatives by eliminating at least one version of a second software item contained in the set of dependencies and wherein the activation service resolves conflicts with the set of alternatives and selects a single solution for execution.

15. The computer-readable storage medium of claim 14, having further program code stored thereon, that when executed by the computing environment, causes the computing environment to:
  select the single solution for execution based on policy considerations comprising at least one of:
  selecting the single solution based on a most current compatible version of the first software item;
  selecting the single solution based on testing;
  selecting the single solution based on a publisher recommendation;
  selecting the single solution based on maximum functionality;
  selecting the single solution based on a solution including a fewest number of software pieces;
  selecting the single solution based on a lowest integration risk;
  selecting the single solution based on a size of code; or
  selecting the single solution based on maximum isolation of an executable.

16. The computer-readable storage medium of claim 14, having further program code stored thereon, that when executed by the computing environment, causes the computing environment to:
  filter the set of dependencies required by the first software item to be executed with a set of policy considerations.

17. The computer-readable storage medium of claim 14, having further program code stored thereon, that when executed by the computing environment, causes the computing environment to:
  replace a first version of the first software item with a second version of the first software item, based on an entry in a global policy table.

18. The computer-readable storage medium of claim 14, having further program code stored thereon, that when executed by the computing environment, causes the computing environment to:

replace a first version of the first software item with a second version of the first software item wherein the second version of the first software item is included in a range of version numbers for the first software item in a global policy table.

19. The computer-readable storage medium of claim 14, having further program code stored thereon, that when executed by the computing environment, causes the computing environment to:

not replace a first version of the first software item with a second version of the first software item wherein the second version of the first software item is included in a range of excluded version numbers for the first software item in a global policy table.

* * * * *